US011385762B2

(12) United States Patent
Johnston et al.

(10) Patent No.: US 11,385,762 B2
(45) Date of Patent: Jul. 12, 2022

(54) ROTATIONAL DEVICE FOR AN AUGMENTED REALITY DISPLAY SURFACE

(71) Applicants: Aaron Michael Johnston, Santa Fe, NM (US); Louis Anthony Romero, Albuquerque, NM (US)

(72) Inventors: Aaron Michael Johnston, Santa Fe, NM (US); Louis Anthony Romero, Albuquerque, NM (US)

( * ) Notice: Subject to any disclaimer, the term of this patent is extended or adjusted under 35 U.S.C. 154(b) by 0 days.

(21) Appl. No.: 17/189,216

(22) Filed: Mar. 1, 2021

(65) Prior Publication Data

US 2021/0271371 A1 Sep. 2, 2021

Related U.S. Application Data

(60) Provisional application No. 62/982,299, filed on Feb. 27, 2020.

(51) Int. Cl.
*G06T 7/70* (2017.01)
*G06F 3/04815* (2022.01)
*G06F 3/01* (2006.01)
*F16M 13/04* (2006.01)
*F16M 11/08* (2006.01)

(52) U.S. Cl.
CPC ......... *G06F 3/04815* (2013.01); *F16M 11/08* (2013.01); *F16M 13/04* (2013.01); *G06F 3/017* (2013.01); *G06T 7/70* (2017.01); *G06T 2207/30208* (2013.01)

(58) Field of Classification Search
CPC ....... G06F 3/04815; G06F 3/017; G06T 7/70; F16M 11/08; F16M 13/04
USPC .......................................................... 345/419
See application file for complete search history.

(56) References Cited

U.S. PATENT DOCUMENTS

| | | | | |
|---|---|---|---|---|
| 2013/0278631 | A1* | 10/2013 | Border | G02C 5/143 345/633 |
| 2014/0313226 | A1* | 10/2014 | Feiner | G06F 1/1694 345/633 |
| 2016/0232715 | A1* | 8/2016 | Lee | A63F 13/211 |

\* cited by examiner

*Primary Examiner* — Nguyen T Truong (57) ABSTRACT

A device for displaying AR markings comprising a top and a base, with the top rotatably attached to the base, and the base configured to be held by a hand or placed on a fixed surface. The AR markings are positioned on the top such that when the top rotates with respect to the base, so do the AR markings. When the AR markings are scanned by an appropriate scanning and display device, such as a smart phone, a 3d image associated with the AR markings will be displayed on the display device as an augmented reality projection. When the top rotates with respect to the base, so too does the augmented reality projection.

20 Claims, 8 Drawing Sheets

ROTATIONAL DEVICE FOR AN AUGMENTED REALITY DISPLAY SURFACE

BACKGROUND

Augmented reality (AR) is an emerging technology in which computer-generated sensory simulations of virtual reality (VR) are applied to or otherwise integrated with the sensory simulations of the real world. One advantage of augmented reality over purely virtual reality, is that augmented reality may build upon a real world experience, which is not only, inherently, more realistic, but often perceived as more important, while simultaneously providing a virtual layer which may provide fantastic or imaginary material for entertainment or contextual information to explain or describe the real world. However, while the real world and virtual worlds may each be self-contained, with the former not requiring the latter and the latter only requiring the former to the degree that hardware is necessary for an individual to enter and experience the virtual world, augmented reality requires another type of technology and methodology to enable a seamless integration between the real and virtual worlds.

In particular, the spatial aspects of the real and virtual worlds are difficult to reconcile. AR markings are used to fix a virtual experience, in particular its visual or graphical data points, to a real spatial position. By scanning the AR markings using some sort of scanning device, a user may perceive a purely virtual object on a display device. If the display device is equipped with a camera, the user may simultaneously view, on the display device, the visual material of the real world. In particular, the user may view the virtual object in the spatial context of the visual material of the real world. If the user scans the AR marker from a different position, the user may then view the virtual object from a different perspective, and may therefore view a different side of the object. However, unlike real objects, virtual objects projected via augmented reality into the real world cannot be lifted or otherwise manipulated. In this sense, the virtual object loses its degree of realism. Also, there are many instances in which an augmented reality experience may be desired, in particular a three dimensional and multi-perspective experience thereof, in which it is inconvenient to actually walk around the AR marker in order to scan it from different vantages.

Virtual objects can often be manipulated via controllers, such as gloves; however, these controllers are expensive, but even more problematically, they are inconvenient to carry (unlike a smart device). Also, they must often be calibrated prior to use, which may be a relatively trivial step in regard to purely virtual worlds, but is unrealistic in the context of augmented reality, in which an individual traverses the real world and cannot be expected to recalibrate a device every time an augmented reality experience is desired. What is needed is an apparatus that enables the virtual object to be manipulated without requiring more than the ubiquitous smart phone.

SUMMARY

This application described a device for enabling an augmented reality experience and for facilitating the rotation of the visual aspect of that augmented reality experience. The device may comprise a main body rotatably connected to a base. The main body is a physical framework for supporting AR surface via a top surface on which AR markers are mounted, displayed, or otherwise attached. The main body may be connected to the base by a rotational mechanism, such as an annular ring or a shaft. The base may rest upon a fixed surface, such as a table or pedestal, or it may be held by a user.

DETAILED DESCRIPTION

Figure 1A:
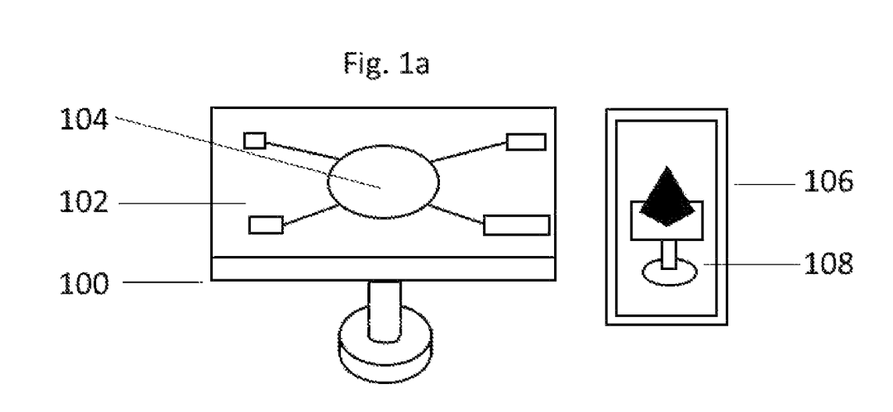
FIGS. 1a-c show views of an exemplary device.
Figure 1B:
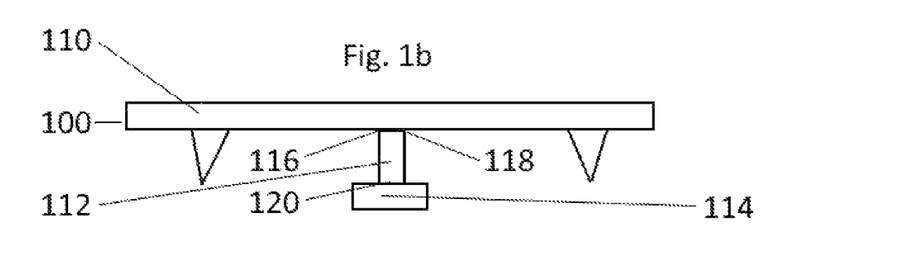
Figure 1C:
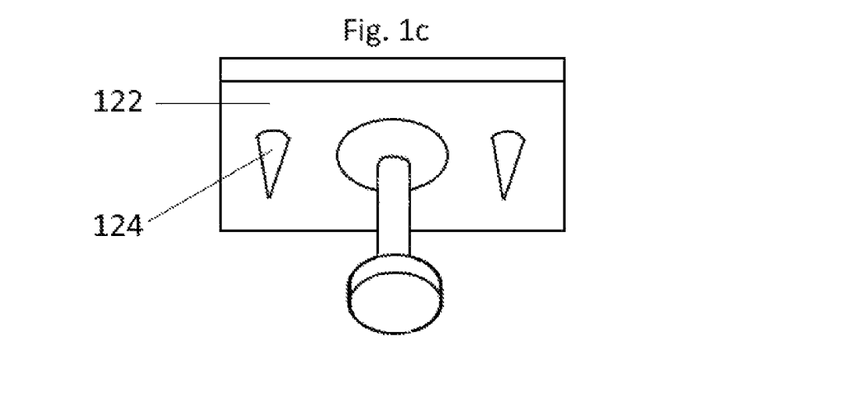
Figure 2A:
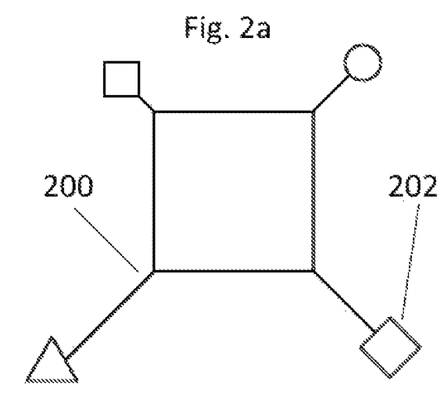
FIGS. 2a-f show exemplary AR markers.
Figure 2B:
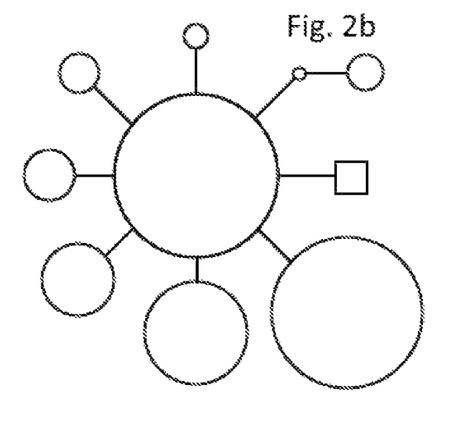
Figure 2C:
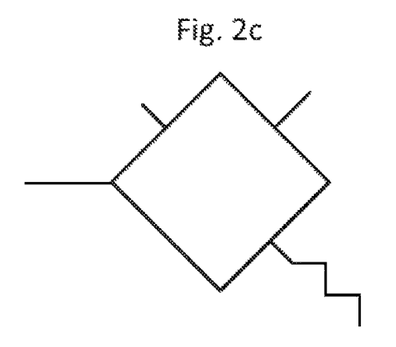
Figure 2D:
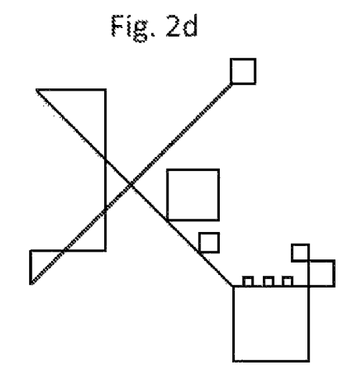
Figure 2E:
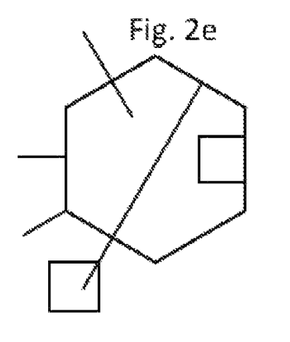
Figure 2F:
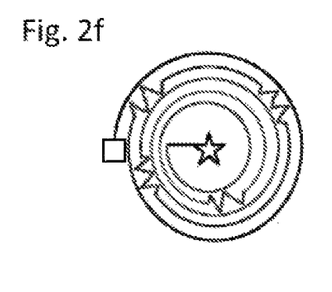
Figure 3A:
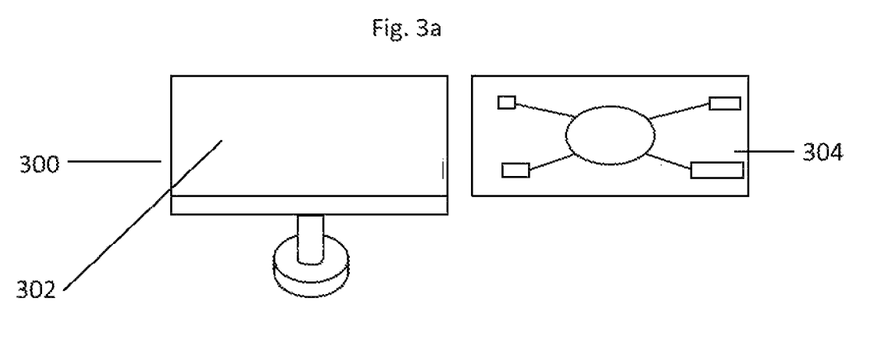
FIGS. 3a-d show an exemplary sleeve configuration for receiving an AR marker surface.
Figure 3B:
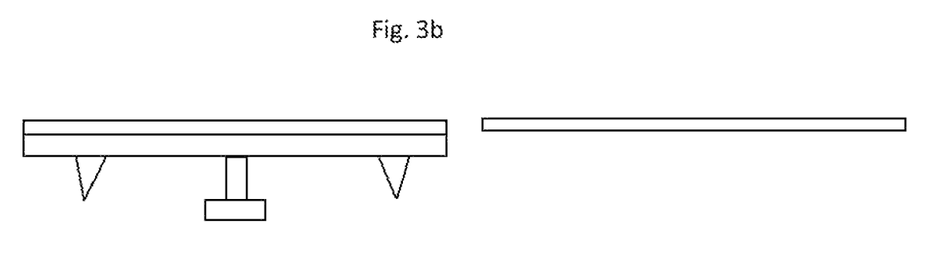
Figure 3C:
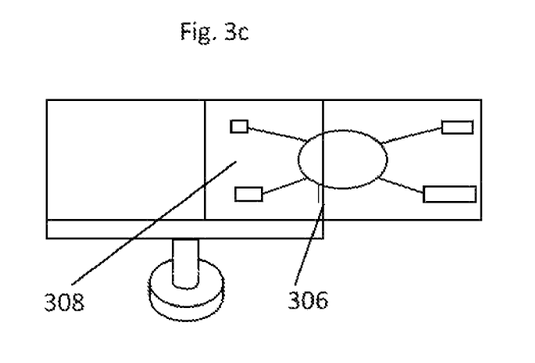
Figure 3D:
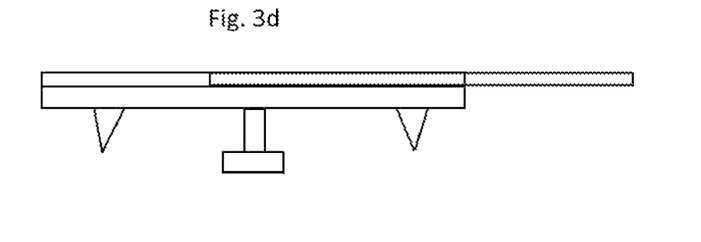

The present invention conceives a rotational body, or as shown in FIG. 1 a-c, a main body 100 for an augmented reality display surface 102. The main body is ideally configured to be held in one hand, preferably between the thumb and index finger or thumb and middle finger. The augmented reality display surface may be flat or contoured, hinged and foldable or fixed, and may feature one or more markers 104 configured to be capturable by a scanning device 106, such as a camera, or any other device equipped with a camera or scanner. The scanning device may feature a monitor or display screen 108, may be concurrently connected or connectable to a monitor or display screen, or may be capable of transmitting graphic data to a monitor or display screen.

As shown in FIG. 2a-f, a marker 200 may comprise one or more lines 202 and shapes 204 of consistent or varying thickness, color, or texture. The marker is graphically displayed on the augmented reality display surface, and it may be printed on the surface, digitally displayed, or projected. The marker may be limited to the center of the display surface, be graphically bounded in the center, or be in contact with the edges. Multiple markers may graphically intersect, overlap, or be separated by white or neutral space. Markers may be distinguished by color, line thickness, texture, or placement.

In one embodiment, a plurality of markers are connected via one or more lines. Each marker may be positioned in a corner or circumferential position of the augmented reality display surface. The connecting lines may form their own shape, such as a circle, square, or other geometric, pictoral, or abstract shape. This shape may form an inner area of negative space in which no markings appear.

Data relating to the marker, together with the marker, may be saved to a database. The data may include digital media files of various formats, including fbx, dae, 3ds, dxf, obj, gITF, USDZ, skp, or any other 3d content file format. The media files may include textures, skins, and animations. The data may include models relating to three dimensional objects or surfaces onto which graphic display data will be projected, such as wire-frame, polygonal, or curve models.

This database may be saved locally on the scanning device or remotely on a separate system. Local access may include the storage of the database on the scanning device itself or on a separate device into which the scanning device may be plugged into, either directly via a port or by means of a cable. Remote access may include connecting the scanning device to the separate system by means of a wireless protocol, such as Bluetooth or WiFi.

Access to the database may be limited by various permissions that may be granted or denied by a system administrator or by the system directly. Access may be predicated on having an account, paying a one-time fee, subscribing, and/or the user being of sufficient age.

The main body provides a support for the augmented reality display surface. The display surface may be mounted, attached to, or otherwise integrated onto the main body. In one embodiment, the main body may be rigidly or rotationally fixed onto a stand or platform. In another embodiment, the main body may be placed or otherwise temporarily inserted onto or into a stand or platform. The main body may be attached to a lanyard in order for it to be hung around a user's neck or on a peg.

In one embodiment, as shown in FIG. 1a-c, the main body 100 may comprise a top 110 attached to a shaft 112, with the shaft attached to a base 114. One end 116 of the shaft is attached approximately to the center of the top 118 and the other end 120 of the shaft is at least circumferentially surrounded by the base.

The main body may feature an underside 122, which is exposed to the shaft and base. The underside may feature one or more projections 124 that project orthogonally from an approximate plane of the top. The projections may have a flat portion, one or more substantially concave portions, and/or one or more substantially convex portions. The substantially convex portions are configured to at least partial receive and engage with the tips of human figures and to be gripped thereby.

The projections may be disposed at regular intervals in degrees around the center. The projections may appear every 10, 15, 20, 30, 40, 45, 50, 60, 70, 75, 80, 90, 100, 115, 120, 130, 140, 145, 150, 160, 170, or 180 degrees. The projections may also be disposed at multiple distances away from the center. The projections may appear within approximately 1, 2, 3, 4, 5, 6, 7, or 8 cms from the center. By arranging multiple projections in this manner, it will be simple for the user to access the projections regardless of the circumferential or radial position of a projection vis-a-vis a given finger. The projections may extend 1, 2, 3, 4, 5, 6, 7, 8, or more ems from the top.

The projections may be of fixed shape, or compressible in order to reduce the overall thickness of the rotational main body. The projections may be compressed by means of a series of interlocking shapes where the size of each shape is smaller than its adjacent outer shape. Alternatively, the projections may be spring-loaded or hingedly attached to the top.

The top may feature a mounting mechanism for mounting the display surface onto the top. The mounting mechanism may feature adhesive, grip, vice, bracket, hinge, or screw and nut fastening components. A top surface cross section of the top may have the same width and length as the display surface, or it may be smaller, or larger. The top surface cross section of the top is preferably rectangular, but it may also be substantially circular, polygonal, cross-shaped, or star-shaped.

As shown in FIG. 3a-d, the top 300 may feature a sleeve 302 into which the display surface 304 may be inserted. This sleeve is open on one or more sides 306 and preferably has a transparent face 308 for permitting the display surface to be viewed without being physically touched. The sleeve opening may be sealable to prevent the display surface from slipping out.

In one embodiment, the top is rotationally attached to the shaft and the shaft is fixedly attached to the base. The top may be circumferentially rotatable around the shaft, or it may be spherically rotatable, with the point of spherical rotation centering on a bulb disposed on the top of the shaft such that the top and shaft engage like a ball and socket. It is also conceivable for the top to comprise the ball and for the shaft to comprise the socket. Rotation between the top and the shaft may be impeded by high-friction texture, locking positions, or extreme similarity in the size and shape of the portions of the top and the shaft that interact, such that the portion of the top that engages with the portion of the shaft tightly squeezes or is squeezed by the portion of the shaft, thus requiring a user or other source to overcome a threshold force in order to rotate the top.

In another embodiment, the top is fixedly attached to the shaft and the shaft is rotationally attached to the base. In one variation of this embodiment, the shaft and base may be inversely and interactively threaded, such that rotational movement of the base vis-a-vis the shaft enables the base to travel up the shaft axis toward the top. In this variation, the shaft and base may include a terminus projection, such that movement along the shaft axis is impeded. The terminus projection may be embedded in or extend from the shaft, and may engage with a receiving introjection inside the base, the collision of which prevents further movement. Alternatively, the terminus projection is embedded in the base and engages with a receiving introjection inside the shaft. In another variation, threading on the shaft or base is not coterminous with the full length of the shaft or base. In yet another variation of this embodiment, the base sits on a track surrounding a single segment of the shaft axis, such that the base may be spun around the track without moving up or down the shaft.

In one embodiment, a first end of the shaft is permanently fixed to an underside of the top. The shaft is rotationally coupled to the base, which fits around the second end of the shaft. The rotational coupling may be enabled by a dual sleeve construction, in which an inner sleeve conforms or attaches to the second end of the shaft and the outer sleeve surrounds and is rotationally independent from inner first sleeve. A set of ball bearings may be disposed between the inner and outer sleeves in order to facilitate rotation. One or more middle sleeves may operate as intermediaries between the ball bearings and the inner or outer sleeves in order to better contain the ball bearings, which may be greased in order to lubricate rotation.

The main body may feature a mechanism for the automatic rotation of the top vis-a-vis the base. The mechanism may comprise a spring, which inclines the base toward or away from the top and may be impeded by means of a lock or released therefrom. Once the mechanism is actuated, the base may rotate around, up, and toward the main body. Alternatively, the mechanism may comprise a motor, which mechanically engages the shaft or annular ring and may be electrically actuated by a pressing, flipping, squeezing, or rotating of an actuator. This actuator may be or integrated with the base.

Figure 4:
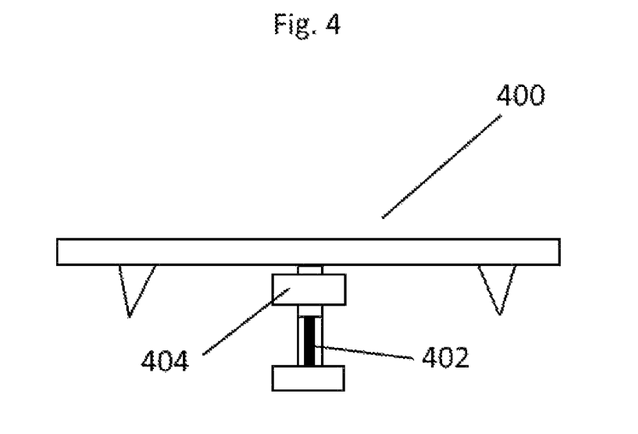
FIG. 4 shows an exemplary device equipped with a motor and motion detector.

As shown in FIG. 4, the main body 400 may feature a motion detector 402 electrically connected to the motor 404, enabling the user to rotate the display surface without touching it or the main body. A processor for processing the gestures may act as an intermediary between the motion detector and the motor, enabling a distinction to be made between hand gestures such that a first set of gestures will cause the motor to rotate clockwise while a second set of gestures will cause the motor to rotate counter-clockwise.

The motor may operate via magnets, including electrically activated magnets. The controller may be fixed to the main body or base, or may comprise a remote.

As shown in FIG. 5a-f, the shaft may be an annular ring 500. In particular, the main body 502 may be rotationally connected to the base 504 via the snap-fit annular ring, with matching snap-fit modules 506, 508 disposed on the main body and the base. The snap-fit modules may comprise rings of projections extending orthogonally from the main body and the base. The tips of the projections may comprise grips, with the grips extending at least slightly from the projections at an angle between 0 and 180 degrees from the projections themselves. These projections may engage with and the grips may at least partially wrap around the annular ring. The annular ring may have an outer surface 510 and an inner surface 512, in which case one ring of snap-fit modules may be an inner ring to engage with the inner surface of the annular ring and one ring of snap-fit modules may be an outer ring to engage with the outer surface of the annular ring. Engagement here means an attachment resulting from the mutual application of forces between the snap-fit modules, the projections, and/or the grip tips and a surface of the annular ring. The application of force must be sufficient to prevent disengagement, i.e., separation thereof, while permitting rotation. The ring of projections may feature repeating gaps such that one projection is not directly connected to another, or incompletely connected, so that a degree of independence of movement is provided between projections. This degree of independence allows the outer ring of projections to stretch or extend outward in order to receive the outer surface of the annular ring and then revert back inward in order to fix the annular ring. Conversely, the degree of independence may permit the inner ring of projections to extend inward in order to squeeze through the inner surface of the annular ring and then revert outward to fix the annular ring. In one variation, the annular ring is permanently fixed to the main body or the base, in which case it may only have either an inner or outer surface to engage with, respectively, an inner ring or outer ring of projections.

Figure 5A:
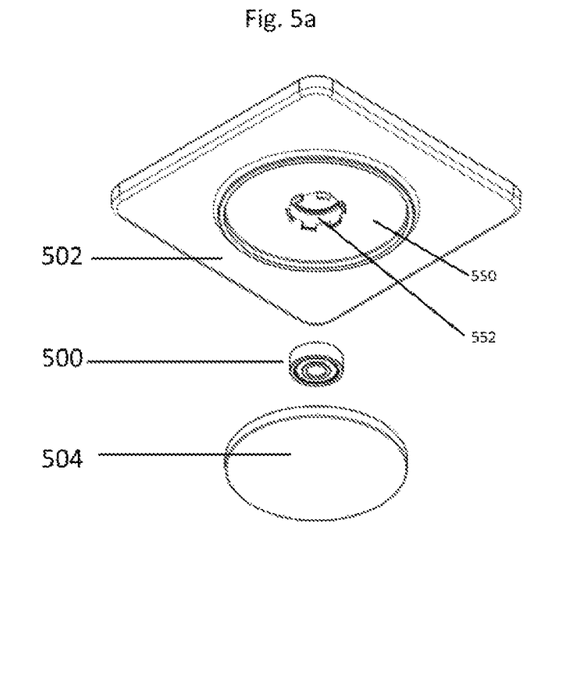
FIGS. 5a-d show an exemplary device with an annular ring in an expanded view, with FIG. 5d being a cross-sectional view.
Figure 5B:
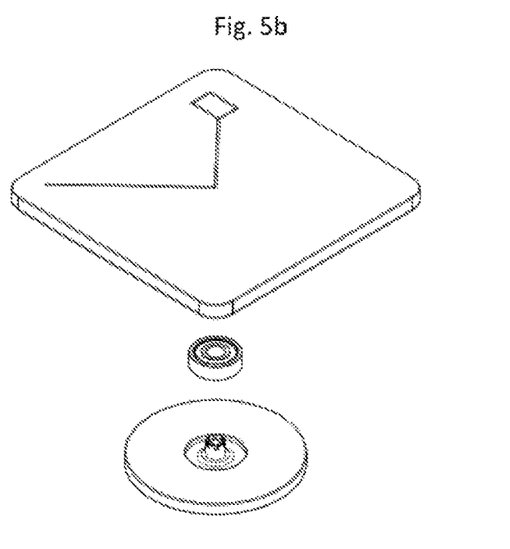
Figure 5C:
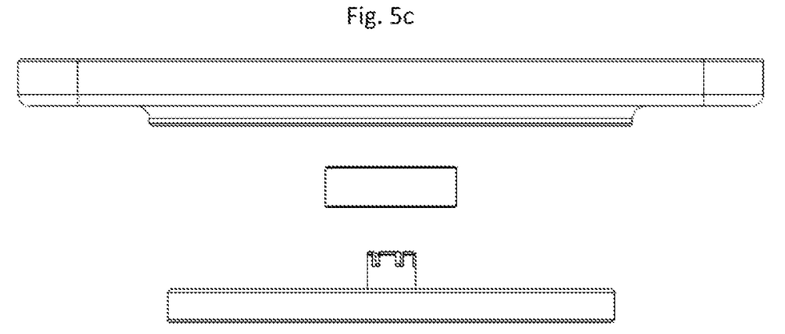
Figure 5D:
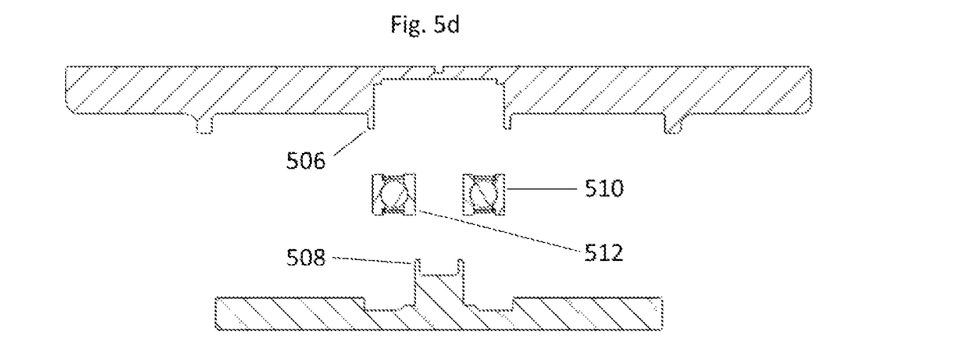
Figure 5E:
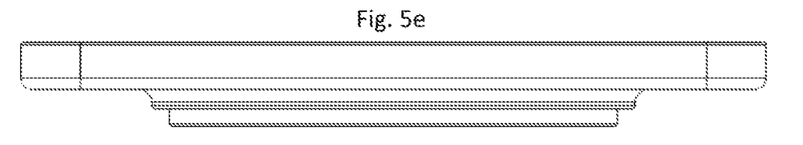
FIGS. 5e-f shown an exemplary device with an annular ring in a compact view with FIG. 5f being in a cross-sectional view.
Figure 5F:
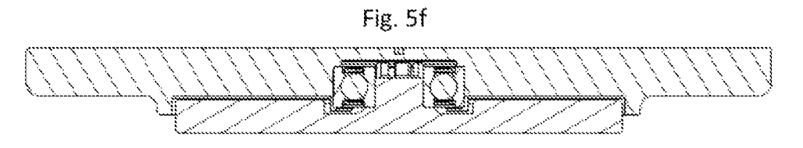

As shown in FIGS. 5a-b, the underside may comprise a recess 550. This recess may be substantially the same size or greater than the base, allowing the base to be disposed in the underside for more convenient storage and to reduce the overall thickness of the main body. The recess may be shaped like the base, or may comprise a shape that is more encompassing than the base—for instance, if the base is polygonal, the recess may be circular, with the diameter of the circular shape being equal to or greater than the longest diameter of the polygonal base. In one version, the recess has at least one side gap permitting a finger to enter the recess in order to move, preferably by spinning, the base out of the recess and down the shaft or annular ring. The underside may comprise a secondary recess 552 sharing the same center as the primary recess and configured to receive the annular ring.

Figure 6A:
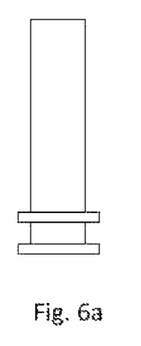
FIGS. 6a-c show exemplary shafts.
Figure 6B:
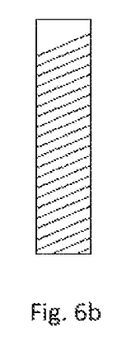
Figure 6C:
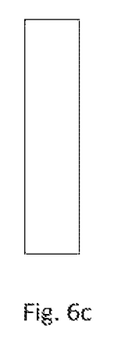
Figure 6D:
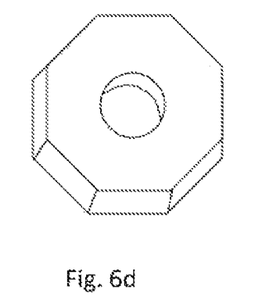
FIGS. 6d-f show exemplary bases.
Figure 6E:
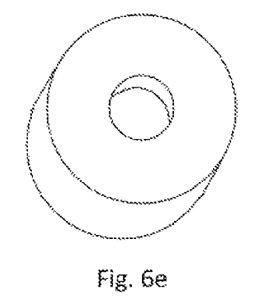
Figure 6F:
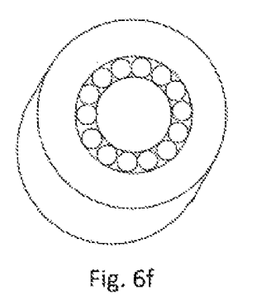
Figure 6G:
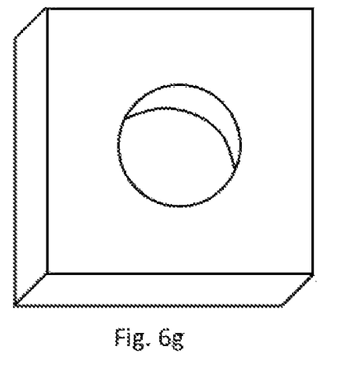
FIGS. 6g-h show exemplary top recesses.
Figure 6H:
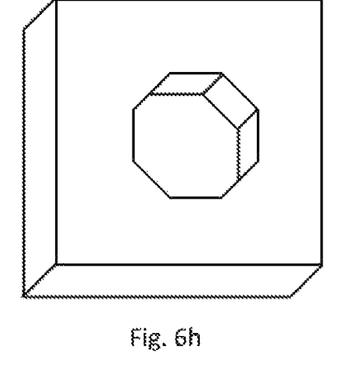

The shaft may feature a track, as shown in FIG. 6a, threads, as shown in FIG. 6b, or smooth, as shown in FIG. 6c. The base may be polygonal, as shown in FIG. 6d, disc-like, as shown in FIG. 6e, or feature ball bearings to facilitate rotation, as shown in FIG. 6f. The recess may be disc-like, as shown in FIG. 6g, or polygonal, as shown in FIG. 6g.

Figure 7A:
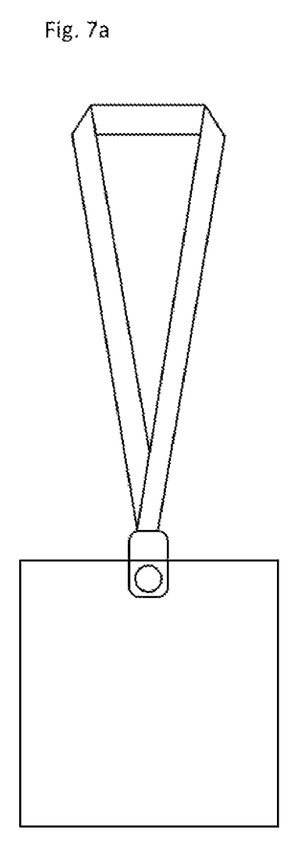
FIGS. 7a-b show an exemplary device with a lanyard attachment.
Figure 7B:
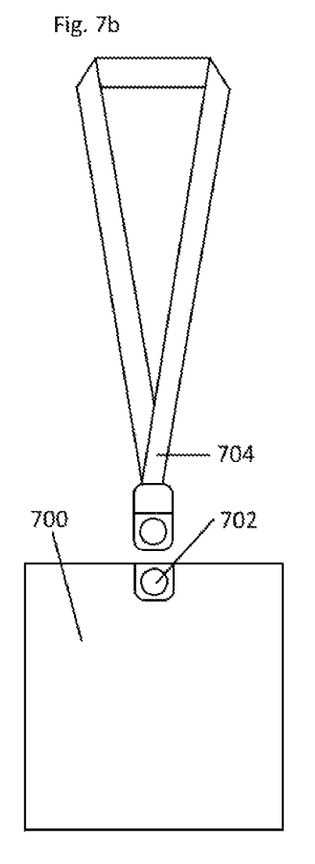

As shown in FIGS. 7a-b, the main body 700 may feature a connecting mechanism 702 which enables it to be attached or attachable to a lanyard 704. The connecting mechanism may comprise a carbiner, joint, snap-fit button, spring-loaded grip, or other connecting means. The main body may be inserted into a lanyard pendant frame, with the pendant frame providing at least one opening for the main body to be inserted and another side or face permitting the main body to be viewed and/or activated. The lanyard pendant frame may comprise a bottom opening permitting the base to extend outward from the main body and to provide access to actuation of the base vis-a-vis the main body when the main body is inside the lanyard pendant frame. The pendant frame may connect to the lanyard by any of the connecting mechanisms referred to previously. The lanyard itself may be made of cloth, cord, fiber, string, or other flexible strand-shaped material.

The base may have a shaft-facing inner surface and a user-facing outer surface. The base inner surface may be grooved, threaded, smooth, or otherwise configured to interact with the shaft. Similarly, the shaft outer surface may be grooved, threaded, smooth, or otherwise configured to interact with the base. The cross sections of the shaft outer surface and base inner surface are preferably substantially circular, and while the average diameter of the base is greater than the average diameter of the shaft, portions of the shaft may have a larger diameter than portions of the base. This relationship prevents the base from slipping off the shaft entirely and yet enables it to remain at a particular height along the shaft, depending on actions by the user. In one version, the average diameter of the shaft is less than 1 mm smaller than the average diameter of the base. In another version, the average diameter of the shaft is 1-2 mm smaller than the average diameter of the base. The average shaft diameter may be between 1-2 mm, 2-3 mm, 3-5 mm, 5-7 mm, 7-9 mm, 9-11 mm. The shaft length, from top to bottom, may be approximately 5 mm, 10 mm, 15 mm, 20 mm, 25 mm, 30 mm, 35 mm, 40 mm, 45 mm, 50 mm, 55 mm, or 60 mm. In one embodiment, the shaft may be between 6 and 10 cm. In another embodiment, the shaft may be greater than 10 cm.

The outer surface of the base will have an average or approximate diameter greater than the average or approximate diameter of the inner surface of the base. The outer surface may be substantially circular, or polygonal, and may comprise grooves, flat portions, ridges, or other surface irregularities or textures configured to provide a better grip for the user. The base may be continuous from a top side to a bottom side, or it may be tiered. The bottom tier may be conical, pyramidal, or in another shape in which the diameter decreases as the cross section layer approaches the bottom. The base outer surface may have an average diameter 1, 2, 3, 4, 5, 6, 7, 8, 9, 10, 11, 12, 13, 14, 15, 16, 17, 18, 19, 20, or more than 20 mm greater than the inner surface average diameter.

In a preferred embodiment, the base is held between one finger and a thumb while a second finger stretches out and up toward the projections, but in an alternative embodiment, one or more gaps may be disposed between the base outer and inner surfaces, allowing a finger to be inserted therein to access the projections, such that the inserted finger is within a space bounded by the first finger and the thumb.

In one embodiment, a data communication chip may be embedded in the main body. Specifically, the data communication chip may be embedded in the top, the annular ring or shaft, or the base. The data communication chip may be accessed by a smart device via a wireless protocol, such as bluetooth, WiFi, or NFC (near-field communications).

The data communication chip may contain additional information associated with the AR marker, such as contextual descriptions in readable text, meta-data such as format and file data relating to the an AR file associated with the AR marker, data relating to the AR design surface such as the date of creation or the most recent update date, or data relating to the physical device itself, such as the date of manufacture, the date of purchase, or information about the user or owner of the device, such as account information. In one embodiment, the data communication chip is configured not only to be read but also to write data to itself. Such data may include the number of times it has been accessed or the identities of the devices which accessed it. The data communication chip may also be integrated into a payment system, such that a user is automatically charged based on access.

To assist the data communication chip in these various tasks, it may be connected to a processor capable of generic digital operations. The data communication chip and processor may connected to a digital display embedded in the main body to enable the visual communication of messages to users without requiring the users to look at their own (smart) display devices.

The invention claimed is:

1. A device for facilitating the rotation of augmented reality projections comprising a top and a base;
   a. the top configured to display one or more augmented reality markers;
      i. the one or more augmented reality markers configured to be scanned by a mobile device and associated with augmented reality data;
      ii. the augmented reality data being visual data for three dimensional graphical projections, with the three dimensional graphical projections configured to be displayed on the mobile device upon the one or more augmented reality markers being scanned by the mobile device;
   b. the top additionally comprising an underside, the underside being rotatably engaged with the base.

2. The device in claim 1, with the base comprising a bottom surface, the bottom surface being substantially flat and configured to be placed upon an article of furniture, with the top configured to be rotated by a human hand.

3. The device in claim 1, with the base configured to be held by a human hand, between a thumb and a first finger, and with the underside of the top being configured to be rotated by a second finger.

4. The apparatus in claim 3, the apparatus additionally comprising a set of physical projections, the physical projections extending orthogonally from the underside of the top and configured to engage with the tip of the second finger and to facilitate rotation of the top by the second finger with respect to the base.

5. The apparatus in claim 4, with at least one physical projection of the set of physical projections being convex and configured to receive and be gripped by the second finger.

6. The device in claim 1 additionally comprising an annular ring, with the annular ring disposed between the top and the base and configured to attach to each of the top and the base via snap fitting.

7. The device in claim 1, with the underside comprising a recess, the recess being configured to receive the base.

8. The device in claim 1, additionally comprising a motor and a motion sensor;
   a. the motor connecting the top and the base and configured to electro-mechanically rotate the top with respect to the base; and
   b. the motion sensor being informationally connected to the motor and configured to receive hand gestures from a user, the hand gestures corresponding to instructions to rotate the top with respect to the base.

9. The apparatus in claim 8, with the lanyard pendant frame comprising a bottom opening, the bottom opening configured to provide a user access to actuation of the base when the top is inserted into the lanyard pendant frame.

10. The device in claim 1, with the top comprising a sleeve, the sleeve being configured to receive replaceable augmented reality markers.

11. The apparatus in claim 1, with the top configured to be attached to a lanyard.

12. The apparatus in claim 1, additionally comprising a lanyard pendant frame,
    a. with the lanyard pendant frame comprising a frame for holding the top, a side opening through which the top can be inserted, and a face through which the top can be viewed;
    b. with the lanyard pendant frame configured to attach to a lanyard;
    c. with the top configured to be inserted into the lanyard pendant frame.

13. An apparatus for enabling an augmented reality experience comprising a top and a base;
    a. with the base being configured to be held in a hand;
    b. with the top having an underside, the underside being exposed to the base and configured to be gripped by a human finger of the hand;
    c. with the top being rotatably engaged with the base and featuring an augmented reality marker, the augmented reality marker configured to be detected by a mobile device with a display screen and enable the mobile device to display on the display screen an augmented reality graphic superimposed on a visual of the top, with the augmented reality graphic configured to rotate with respect to the human hand when the top is rotated by the human hand
    d. with the top configured to be attached to a lanyard.

14. The apparatus of claim 13, with the top being rotatably engaged with the base via an annular ring.

15. The apparatus of claim 13, with the top comprising a recess, the recess being configured to receive the base.

16. The apparatus of claim 13, with the top comprising a sleeve, the sleeve having a transparent face and being configured to receive replaceable augmented reality markers.

17. The apparatus in claim 13, additionally comprising a motor and a motion sensor;
    a. the motor connecting the top and the base and configured to electro-mechanically rotate the top with respect to the base; and
    b. the motion sensor being informationally connected to the motor and configured to receive hand gestures from a user, the hand gestures corresponding to instructions to rotate the top with respect to the base.

18. The apparatus in claim 13, additionally comprising a lanyard pendant frame,
    a. with the lanyard pendant frame comprising a frame for holding the top, a side opening through which the top can be inserted, and a face through which the top can be viewed;
    b. with the lanyard pendant frame configured to attach to a lanyard;

c. with the top configured to be inserted into the lanyard pendant frame.

19. The apparatus in claim 18, with the lanyard pendant frame comprising a bottom opening, the bottom opening configured to provide a user access to actuation of the base when the top is inserted into the lanyard pendant frame.

20. The apparatus in claim 13, the apparatus additionally comprising a set of physical projections, the physical projections extending orthogonally from the underside of the top and configured to engage with the tip of the second finger and to facilitate rotation of the top by the human finger with respect to the base.

\* \* \* \* \*